United States Patent [19]

Krupnik

[11] Patent Number: 4,806,908
[45] Date of Patent: Feb. 21, 1989

[54] LOW PROFILE BACKLIGHTED KEYBOARD

[75] Inventor: Elliot Krupnik, Gloucester, Mass.

[73] Assignee: Astronics Corporation, Orchard Park, N.Y.

[21] Appl. No.: 49,371

[22] Filed: May 14, 1987

[51] Int. Cl.$^4$ ............................................. G06F 3/00
[52] U.S. Cl. .................................... 341/22; 340/712; 200/5 R
[58] Field of Search ........ 340/365 R, 365 P, 365 VL, 340/712, 781; 250/221; 400/472, 490; 200/5 R, 5 A, 5 B, 5 C, 5 D, 5 E, DIG. 25

[56] References Cited

U.S. PATENT DOCUMENTS

| | | | |
|---|---|---|---|
| 3,767,022 | 10/1973 | Olson | 340/365 P |
| 3,856,127 | 12/1974 | Halfon et al. | 340/365 P |
| 4,379,968 | 4/1983 | Ely et al. | 340/365 P |
| 4,480,184 | 10/1984 | Ely | 340/365 P |
| 4,551,717 | 11/1985 | Dreher | 340/365 P |
| 4,617,461 | 10/1986 | Subbaras et al. | 340/365 P |
| 4,712,092 | 12/1987 | Boldridge, Jr. et al. | 340/365 R |

OTHER PUBLICATIONS

M. M. Astrahan–"EL–PC Keyboard"–IBM Technical Disclosure Bulletin–vol. 3, No. 3 Aug. 1960–pp. 65–66.

Primary Examiner—Gerald L. Brigance
Assistant Examiner—Mahmoud Fatahi-yar
Attorney, Agent, or Firm—Shlesinger Fitzsimmons & Shlesinger

[57] ABSTRACT

A plurality of keys are mounted in parallel columns on a key supporting panel for reciprocation between upper, inactive positions and lower, active positions. Each key comprises a translucent core having a legend on its upper end, a conductor on its lower end, and an opening therethrough intermediate its ends. Each core is mounted for reciprocation at its lower end in a plastic sleeve, which is removably mounted by a flexible detent in one of the openings in the panel, and is surrounded adjacent its upper end by a flexible sleeve or hood which resiliently urges the key core to its upper position. In each column of key cores the openings in the latter register with each other, and an elongate electroluminescent strip extends through the registering openings and beneath the panel to prevent accidental withdrawal of the keys, and to illuminate the legends on a column of keys when energized.

12 Claims, 1 Drawing Sheet

U.S. Patent  Feb. 21, 1989  4,806,908
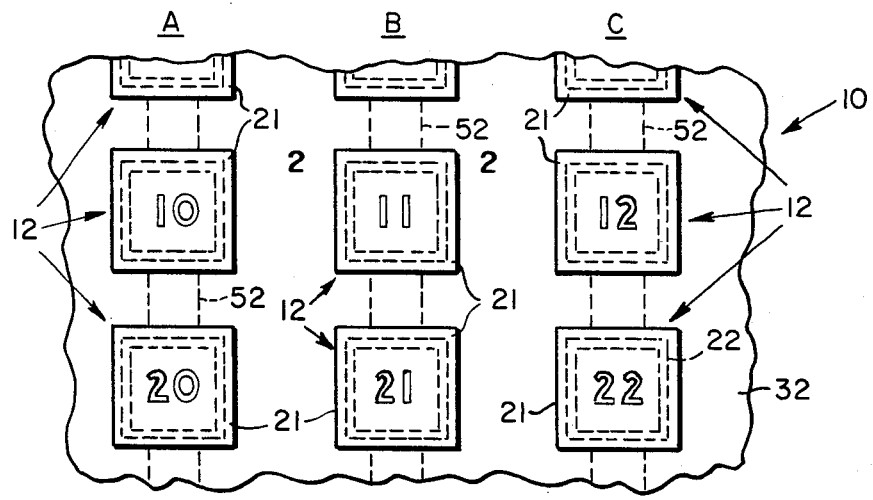
FIG. 1
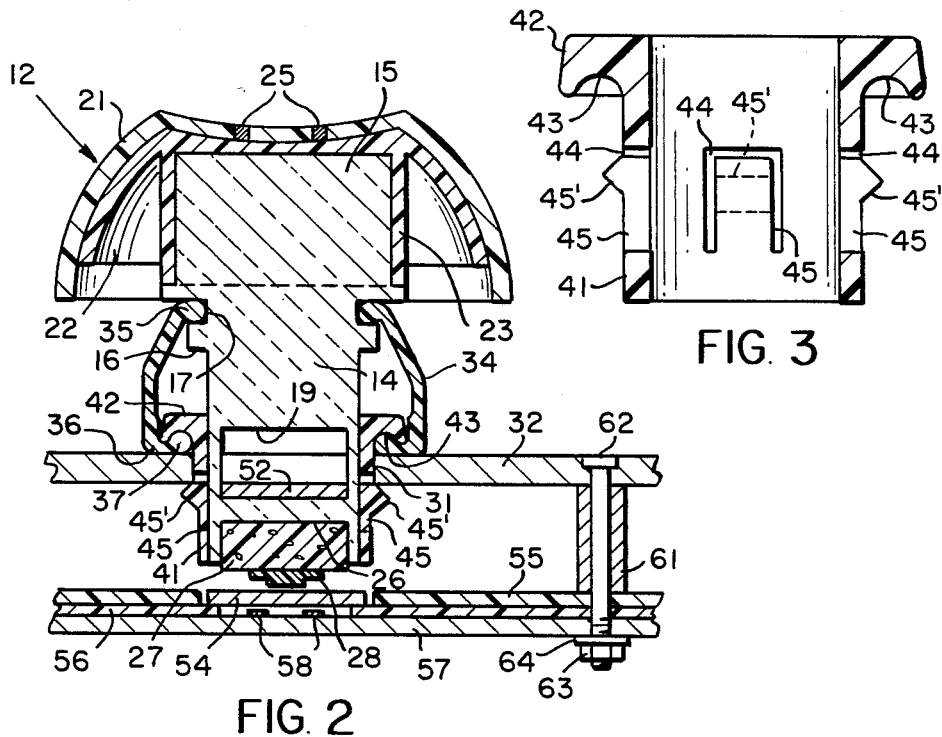
FIG. 3
FIG. 2

LOW PROFILE BACKLIGHTED KEYBOARD

BACKGROUND OF THE INVENTION

This invention relates to full travel keyboards of the type utilized for controlling the operation of circuit boards or the like, and more particularly to an improved keyboard of the type described which utilizes elongate electroluminescent EL panels in strip form for illuminating the keys on the board.

In keyboards of the type described it is necessary to build in a contrast between its various keys and the alphanumeric legends printed or otherwise formed thereon. In many instances this is done simply by using transparent keys that are mounted on a printed circuit board, or the like, for movement relative to the face of the board to control the circuits printed thereon. Typically the legends are printed or otherwise formed on the face of the keys in one color, and the face of the circuit board is provided with a contrasting color, so that the legends will be readily visible on the keys. In some cases it has also been conventional to utilize some means for illuminating the keys so that the legends thereon will be readily visible.

It is an object of this invention to provide improved means for illuminating or backlighting the keys of a full travel keyboard, which is substantially more inexpensive to manufacture and assemble than prior such boards.

Still another object of this invention is to provide improved, backlighted keyboards of the type described in which low power, EL panel strips are utilized to provide illumination for the keys, and to secure the keys against accidental removal from the board. Other objects of the invention will be apparent hereinafter from the specification and from the recital of the appended claims, particularly when read in conjunction with the accompanying drawings.

SUMMARY OF THE INVENTION

A series of full travel keys are arranged in spaced columns and intersecting, parallel rows for reciprocation in a keyboard retaining panel, that overlies a printed circuit board. Each key has a transparent body section, which is rectangular in cross-section, and has secured over its upper end, a plastic key cap containing apertures or slots which define an alphanumeric character. The lower end of the key overlies the usual conductive disc, which is adapted to be depressed by the key selectively to operate an associated circuit that is printed on the board beneath the disc.

Intermediate its ends the body section of each key has therethrough a rectangular slot; and in each row, or in each column of keys, the rectangular slots in the body sections thereof register with each other. An elongate EL panel or lamp, which is in the form of a strip, extends beneath the retaining panel and through each series of registering openings in the body sections of the keys, both to provide illumination for the keys, and to prevent withdrawal of the keys from the retaining panel.

THE DRAWINGS

FIG. 1 is a fragmentary plan view of an improved, backlighted keyboard made according to one embodiment of this invention;

FIG. 2 is a greatly enlarged fragmentary sectional view taken generally along the line 2—2 in FIG. 1 and looking at the direction of the arrows; and FIG. 3 is an enlarged cross-sectional view of one of the rectangularly shaped sleeves, which surround and guide the keys for reciprocable movement on the keyboard.

PREFERRED EMBODIMENTS OF THE INVENTION

Referring now to the drawings by numerals of reference, 10 denotes generally a full travel keyboard having mounted thereon a plurality of spaced keys, which are arranged in spaced, parallel columns (denoted at A,B,C, etc. in FIG. 1) and intersecting parallel rows. Each key comprises a clear, transparent or translucent body section 14 (FIG. 2), which may be made of plastic Lexan, or the like, and which is generally rectangular in cross-section. Each body section 14 has formed on its upper end a slightly enlarged, rectangularly shaped head 15, and has formed thereon intermediate its ends a laterally projecting, rectangularly shaped flange 16, which is disposed in axially spaced, confronting relation to the inner end of the enlarged head 15. Each section 14 thus has formed intermediate its ends between the flange 16 and the inner end of the head 15 a circumferential notch or recess 17. Adjacent its lower end each body section 14 has therethrough a rectangular opening 19, the purpose of which will be described hereinafter.

Secured to and surrounding the head 15 of each body section 14 is a two-piece key cap, comprising an opaque outer section 21, and a translucent inner section 22. Each inner section 22 has an integral, downwardly projecting skirt portion 23, that surrounds and is secured to the head 15 of the associated body section 14. Each outer section 21 has a plane, flat upper surface, which overlies a like surface on the inner section 22, and which has therethrough one or more openings 25 filled with clear epoxy, and the configurations of which are designed to represent the particular alphanumeric character that is to be represented by the associated key 12. Secured in a recess 26 in the lower end of each body section 14, and projecting slightly downwardly beneath the lower end of the body section is a resilient button support 27, which may be made of sponge rubber or the like, and which has fastened to its lower end a disc operating button 28 the purpose of which is noted hereinafter.

Each key 12 is mounted for reciprocation in one of a plurality of rectangular openings 31, which are formed in intersecting columns and rows in a stationary retaining panel 32, which forms part of the associated keyboard frame. As shown in FIG. 2 each key 12 normally is held in an upper, inoperative position by a resilient, inverted, generally cup-shape boot element 34, which is interposed between the retaining panel 32 and the head 15 of the associated key body section 14. Each boot element 34 has in its upper end a rectangular opening bound by an enlarged, bead section 35, which is formed around the upper end of each element 34 to seat snugly and securely in the circumferential recess 17 that is formed in each body section 14 of a key adjacent the inner end of its head 15. Each boot element has on its lower end a laterally inwardly projecting flange 36, which is seated on the upper surface of the retaining panel 32, and which terminates at its inner edge in an enlarged bead section 37 that is generally similar to the bead section 35. Releasably secured in each opening 31 in the retaining panel 32, and surrounding the lower end of the associated key body section 14 is a rectangularly shaped boot locking sleeve and key guide 41. Each sleeve 41, which is made from a resilient, flexible plastic material such as Delrin or the like, extends at its upper end into the lower end of the associated boot element 34, and has formed thereon a laterally outwardly extending flange section 42. Each flange 42 has in its underside a recess 43 in which the bead 37 on the lower end of the associated boot 34 is releasably seated. As shown more clearly in FIG. 2, each recess 43 forms a generally concave surface for accommodating the cooperating convex surface formed by the bead 37 on the associated boot 34.

Also as shown more clearly in FIG. 3, sleeve 41 has in each side thereof an inverted, generally U-shaped slot 44, each of which forms centrally on the associated side of the sleeve an integral, flexible latch or tab 45. Each tab 45 has on its upper end a lateral projection or boss 45', which is disposed resiliently to engage beneath the lower edges of the associated opening 31 in the retaining panel 32 in order to prevent withdrawal of the sleeve 41 upwardly out of the associated opening 31. Latch 45 is designed also to exert against the underside of panel 32 a resilient, axial force, which tends to draw the upper end of the sleeve 41 downwardly relative to the panel 32, thereby resiliently securing the flange 42 on its upper end against the rib or bead 37 formed on the inner end of the associated boot flange 36.

Each of the keys 12 in a respective column (A, B, C, etc.) thereof registers with and is connected to one of a plurality of elongate, flat, strip-shaped electroluminescent (EL) panels or lamps 52. As shown more clearly in FIG. 2, each key 12 in a column thereof has the rectangular opening 19 in its body section 14 positioned to register with like openings in the other keys 12 in that particular column; and each EL panel 52 is mounted so that it extends through the registering openings 19 in a given column of keys 12, and immediately beneath the retainer panel 32. In this way, when one or more of the EL panels 52 is or are illuminated, light therefrom will pass upwardly through the registering openings 31 in the retaining panel 32, through the transparent body sections 14 of the associated keys 12, and through the translucent cap sections 22 to illuminate the openings 25 in the outer, opaque cap sections 21 of the keys. Moreover, as shown more clearly in FIG. 2, since each EL panel 52 extends continuously beneath the retaining panel 32, and through the openings 19 in successive keys 12 in a particular column thereof, each panel 52 functions also to retain the body section 14 of each key against accidental removal from the associated panel 32.

Each body section 14 of a respective key 12 normally is retained resiliently in its upper, inoperative position by virtue of its surrounding boot element 34. In this position the disc operating button 28 on the lower end of each key is held in spaced, registering relation with a conventional, conductive rubber disc 54, which is mounted in known manner beneath each key in an opening that is formed in a rubber panel 55. Panel 55 overlies an insulating aperture mask 56 that is secured on the face of a printed circuit board 57, which is secured accurately in predetermined, spaced relation beneath panel 32 by a plurality of spacer sleeves 61, only one of which is shown in FIG. 2. Each spacer sleeve 61 is secured upright between panels 32 and 57 by a bolt 62, the head of which is seated in a recess in the face of panel 32, and the shank of which extends through sleeve 61 and beyond the underside of panel 57 where its terminal end is secured by a nut 63 that seats against a washer 64.

As shown in FIG. 2, the marginal edges of each disc 54 overlie an opening in the aperture mask 56, normally to be spaced slightly above the spaced conductors 58 of a circuit that is printed on the board 57. When the associated key 12 is depressed against the resistance of the associated boot element 34, opening 19 in the body section 14 of the key is of a height sufficient to permit the key to descent far enough to cause its operating button 28 to engage and urge the registering disc 54 downwardly and electrically to interconnect the conductors 58. When the downward pressure on the key 12 is released, the resilience in the boot element 34 urges the body section 14 of the key upwardly to return the key to its inactive position as shown in FIG. 2, thereby interrupting whatever circuit was previously closed by disc 54.

From the foregoing it will be apparent that the present invention provides relatively simple and inexpensive means for producing an improved, backlighted keyboard in which the various keys 12 can be readily and removably mounted in registering openings in the associated retaining panel 32.

For example, to assemble the board, each boot 34 is first assembled on one of the sleeves 41 so that its bead 37 is seated in the sleeve recess 43. Each boot-sleeve combination 34, 41 is then mounted on the panel 32 by pushing the lower end of each sleeve 41 downwardly through a panel opening 31 until the projections 45' on its four tabs 45 pass beneath and engage or latch against the underside of panel 32. The sliding body section 14 of each key is then inserted downwardly in one of the sleeves 41; and the bead section 35 on the upper end of the associated boot 34 is placed in the circumferential recess 17 that is formed between each body section 14 and its head 15.

After all of the keys have been mounted in panel 32, the EL strips 52 are inserted, one for each column (A, B, C, etc.) of keys. This is done by depressing the keys in each column thereof far enough to enable a respective strip 52 to be inserted through the registering openings 19 in the depressed keys, and beneath panel 32. When the keys in that particular column are released, they will tend to retain that strip 52 resiliently against the underside of panel 32. Thereafter the panel 32 is mounted by the spacers 61 and bolts 62 on the board 57.

By utilizing the EL panel strips 52 it is possible not only readily to illuminate the various keys 12, but also to prevent accidental removal of the keys from the assembly. This considerably eases the assembly of the keyboards, and also reduces the overall manufacturing costs involved in producing the keyboards.

While this invention has been illustrated and described in connection with only one embodiment thereof, it will be readily apparent that it is capable of further modification, and that this application is intended to cover any such modifications that may fall within the scope of one skilled in the art or the appended claims.

I claim:
1. A keyboard, comprising
   a board having a printed circuit on its face,
   means for supporting a keyholder panel on said board above and in spaced relation to said printed circuit,
   a plurality of keys, means for mounting said keys to reciprocate each in a different one of a like plurality of openings formed in said panel in spaced columns, each of said keys comprising a light transmissive core having a conductor on its lower end engagable with said circuit upon depression of a respective key, having a light transmissive legend on its upper end to identify the key, and having a transverse opening therethrough intermediate its ends, said keys being mounted in said panel so that the cores thereof in each column of keys having their transverse openings registering with each other, and an elongated electroluminescent strip extending through the registering openings in the cores of each column of keys to simultaneously illuminate the legends on the upper ends of the associated key cores.

2. A keyboard as defined in claim 1, wherein each of said electroluminescent strips extends through said registering openings and beneath said panel, thereby to prevent withdrawal of the associated key cores from said panel.

3. A keyboard as defined in claim 1, wherein said mounting means comprises a flexible sleeve releasably secured intermediate its ends in each of said openings in said panel, each of said key cores being slidably guided adjacent its lower end for reciprocation in one of said sleeves, and projecting at its upper end above said panel, and a resilient, flexible, generally cup-shaped boot surrounding each of said key cores adjacent its upper end, and being releasably connected at opposite ends thereof to the associated sleeve and key core, respectively, and operative resiliently to urge the associated key core upwardly relative to said panel and into an inoperative position in which said conductor on the lower end thereof is spaced above said printed circuit.

4. A keyboard as defined in claim 3, wherein each of said sleeves has on its upper end a lateral flange disposed to overlie the upper face of said panel, and has thereon intermediate its ends flexible detent means insertable through one of said openings in said panel thereafter to engage the underside of said panel to prevent withdrawal of the sleeve therefrom.

5. A keyboard as defined in claim 4, wherein each of said boots has a flange around its lower end releasably engaged beneath the flange on the upper end of the associated sleeve, and has around its upper end a flange releasably engaged in a circumferential recess in the associated key core.

6. A keyboard, comprising a keyholder panel mounted above and in spaced relation to a printed circuit board, a plurality of keys, each comprising a translucent core having a translucent identifying legend on its upper end, and a conductor on its lower end, and means for removably mounting each key core intermediate its ends in a different one of a plurality of openings in said panel, and for reciprocation between an upper, inactive position, and a lower, active position in which the conductor on the lower end of the key is engaged with a circuit on said board, said mounting means including a pair of flexible, cooperating sleeve members, one of which is releasably secured intermediate its ends in one of said openings in said panel to surround and guide the lower end of one of said key cores for reciprocation in the bore of said one member, and the other of which members surrounds said one key core above said panel, and is releasably secured at opposite ends thereof to said one sleeve member and to said one key core, respectively, and operative resiliently to urge said one key core into its upper, inactive position.

7. A keyboard as defined in claim 6, wherein each of said one sleeve members has a resilient detent projecting laterally outwardly from at least one side thereof intermediate its ends, and disposed to be urged through said opening in said panel and into engagement with the underside of each panel to prevent withdrawal of said one member out of said opening.

8. A keyboard as defined in claim 7, wherein said one sleeve member has lateral flange means on its upper end disposed to overlie the face of said panel, when said detent is engaged with the underside of said panel.

9. A keyboard as defined in claim 6, wherein said other of said sleeve members is generally cup-shaped in configuration and has a flexible, annular wall portion resisting downward movement of the associated key core, and disposed resiliently to collapse when pressure is applied to the upper end of said associated key core and during movement of the latter to its lower, operative position.

10. A keyboard as defined in claim 6, wherein one of the confronting ends of said pair of sleeve members has thereon a circumferential bead flange releasably seated in a registering recess formed in the other of said confronting ends.

11. A keyboard as defined in claim 6, wherein said keys are mounted in spaced, parallel columns in said panel, each of said key cores has therethrough intermediate its ends a transverse opening, and in each column of keys the openings in their associated key cores are in registry with each other, and an elongate electroluminescent strip extends through the registering opening in each column of key cores to illuminate the legends thereon when the associated strip is energized.

12. A keyboard as defined in claim 11, wherein each of said strips passes beneath said panel thereby to prevent withdrawal of the associated key cores from said panel.

* * * * *